United States Patent Office 3,510,535
Patented May 5, 1970

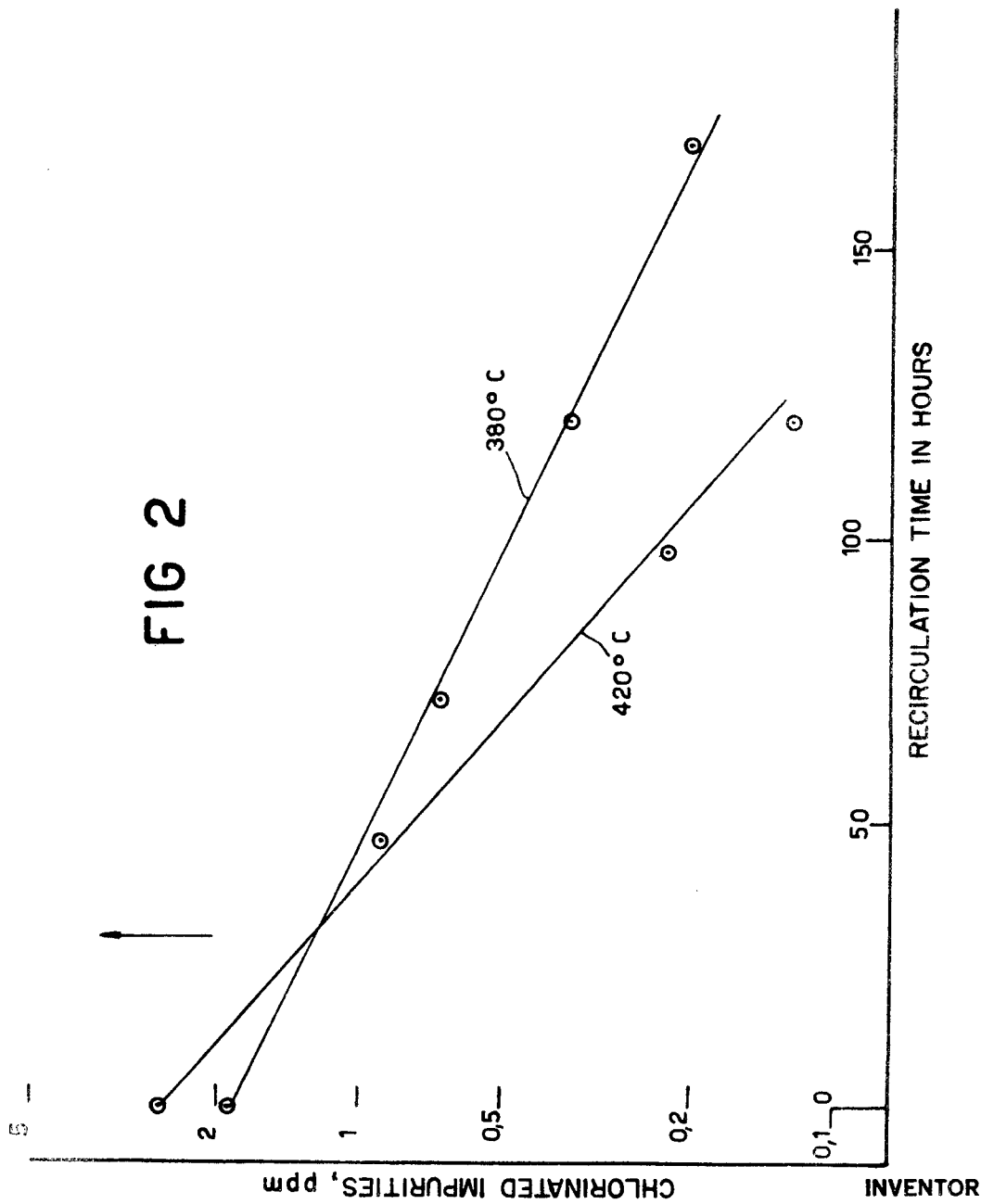

3,510,535
PROCESS AND PLANT FOR THE PURIFICATION OF TERPHENYL AND/OR ANALOGOUS ORGANIC MATERIALS
Giancarlo Imarisio, Varese, Italy, assignor to European Atomic Energy Community-Euratom, Brussels, Belgium
Filed Feb. 11, 1966, Ser. No. 526,838
Claims priority, application Great Britain, Aug. 17, 1965, 35,278/65
Int. Cl. C07c 7/00
U.S. Cl. 260—674　　　　　　　　　　　　　　　2 Claims

ABSTRACT OF THE DISCLOSURE

Chlorine is removed from organic coolants or moderators for nuclear reactors by contacting the hot coolant with a getter metal such as zirconium or titanium or an alloy or mixture thereof. The coolant is circulated at a temperature between 300° C. and 450° C. through a bed of the getter metal in the form of chips, turning, grains or sheets.

---

Figure 1:
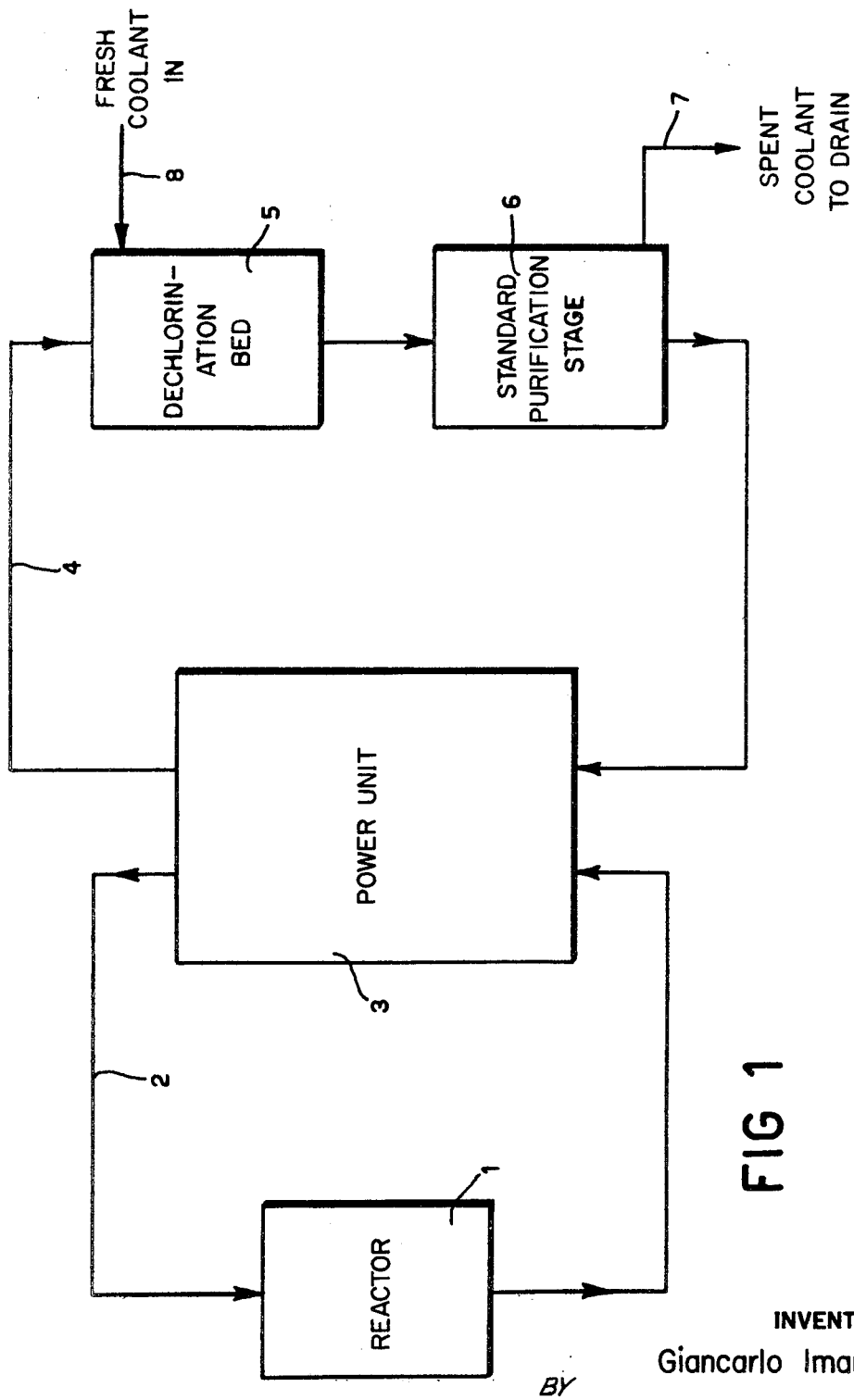

The present invention relates to a process and plant for the purification of terphenyl and/or analogous organic materials which may contain small amounts of dissolved water from chlorinated impurities present in the raw material. Organic materials have been proposed as coolants in nuclear reactors. They can, in practice, be delivered by the supplier only at a relatively low degree of purity, and it is a matter of fact that even very small amounts of chlorinated impurities of the order of 10 or less p.p.m. are very undesirable on account of their effects on the corrosion of the structural materials of the reactor.

It is the aim of the invention to reduce the contents of chlorinated impurities in organic materials of the above quoted type to an extreme minimum, in a continuous and economic way, especially when the organic material serves as reactor coolant and the reactor is in operation.

With hitherto known methods, the organic coolant either is purged with inert gas at high temperature, or it is recirculated through an appropriate catalyst, or distillation of the coolant is carried out over sodium or potassium metal. The drawbacks of the first two methods are that they present only a limited effectiveness at low concentrations, while that third method is a high cost dangerous process.

These disadvantages are reduced when, according to the present invention, the organic material is circulated through a bed containing zirconium and/or titanium, preferably an alloy of both, at temperatures between 300° C. and 450° C. Chips or turning or sheets or grains of the said Zr-metal and/or of Ti-metal, or better of their alloys, should be employed to constitute the purification bed. The metals or the alloys react with the chlorinated compounds contained in the organic material and with the water, in that their surface oxidizes and thus retains the above-mentioned impurities.

It was proven that by aid of this new purification process, in a mixture of o, m and p-terphenyls, the concentration of the chlorine containing impurities lowers from originally 2–10 p.p.m. to 0.1 p.p.m. or even less. The most effective metals and alloys are—apart from Zr and Ti— some of those, already known as getters in electronic tubes. The least corrosion resistant alloy is best in this regard, for instance the alloy consisting of 50% Zr and 50% Ti.

The purification process is very suitable for—though not limited to—the continuous purification of the organic material used as reactor coolant.

In the accompanying drawings:

FIG. 1 shows a simplified example of a purification circuit according to the invention associated with a nuclear reactor, and FIG. 2 shows in semi-logarithmic plot the concentration of chlorinated impurities in p.p.m. as a function of the recirculation time in hours.

In FIG. 1 the reactor is represented by the rectangle 1; it is connected to the main coolant circuit 2, which includes a power unit 3. By far the larger quantity of organic coolant is circulated through this circuit, while a small proportion is continuously withdrawn from the circuit 3 and passes through the purification circuit 4 before returning to circuit 3. A dechlorination bed 5 containing the getter material (e.g. the Zr-Ti alloy aforesaid) is connected in this example in series—to the (always present) standard purification stage 6. The coolant is passed through this bed at temperatures between 300° and 400° C. Spent coolant is drained off the purification stage 6 over line 7. The coolant balance is maintained by adding fresh coolant over feed line 8 into the bed 5.

A second dechlorination bed can be added in the feed line, if desired, in order to intensify the purification.

In some tests carried out, raw OM2—terphenyl (supplied by Progil, France) was circulated in a loop over zirconium strips. The total hold up of organic material was 35 litres. The ratio of exposed zirconium surface to the volume of the organic material was 0.5 dm.²/litre. The water content during the runs was 100 p.p.m.

The change of chlorine concentration versus time of recirculation was recorded: the results obtained at two temperatures, 380 and 420° C., are shown in FIG. 2.

Analyses of the zirconium oxide detached from the zirconium strips showed a chloride concentration in the oxide ranging from 700 to 3000 p.p.m. Longer runs showed a decrease of the chlorine concentration of the terphenyl down to 0.05 p.p.m. All the analytical checks were done by activation analysis.

The invention is not limited to the above described example but can be utilized in all purification plants for analogous organic materials. Organic materials analogous to terphenyls are for instance:

Alkyl, or aromatic compounds of diphenyls and terphenyls;
High boiling products from the oil distillation of the polyalkylphenanthrene group;
High boiling compounds from tar distillation.

I claim:
1. A process for the removal of chlorine from organic coolants for nuclear reactors from the group consisting of terphenyls, alkyl or aryl derivatives of diphenyls and terphenyls, and alkylated phenanthrenes and mixtures thereof comprising circulating the coolant through a bed containing a metal of the group consisting of zirconium, titanium, zirconium-titanium alloys and mixtures thereof, at a temperature between 300° C. and 450° C.

2. A process according to claim 1, in which the metal is an alloy containing substantially equal quantities of zirconium and titanium.

References Cited

UNITED STATES PATENTS 2,909,486　10/1959　Colichman _____ 176—92
3,052,738　9/1962　Bolt et al. _____ 260—666.5
3,063,927　11/1962　Ort et al. _____ 260—668

DELBERT E. GANTZ, Primary Examiner

C. E. SPRESSER, Assistant Examiner

U.S. Cl. X.R.
176—44, 92; 208—262; 260—675